US012218451B2

(12) United States Patent
Mamuro

(10) Patent No.: US 12,218,451 B2
(45) Date of Patent: Feb. 4, 2025

(54) ELECTRICAL CONNECTOR SET

(71) Applicant: Murata Manufacturing Co., Ltd., Kyoto-fu (JP)

(72) Inventor: Minoru Mamuro, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 353 days.

(21) Appl. No.: 17/713,772

(22) Filed: Apr. 5, 2022

(65) Prior Publication Data

US 2022/0231443 A1 Jul. 21, 2022

Related U.S. Application Data

(63) Continuation of application No. PCT/JP2020/037643, filed on Oct. 2, 2020.

(30) Foreign Application Priority Data

Oct. 11, 2019 (JP) ................................ 2019-187604

(51) Int. Cl.
*H01R 13/502* (2006.01)
*H01R 13/424* (2006.01)
*H01R 13/6581* (2011.01)

(52) U.S. Cl.
CPC ....... *H01R 13/424* (2013.01); *H01R 13/6581* (2013.01)

(58) Field of Classification Search
CPC .......................... H01R 13/424; H01R 13/6581
(Continued)

(56) References Cited

U.S. PATENT DOCUMENTS 6,793,506 B1 * 9/2004 Hirata .................. H01R 12/716 439/74
6,893,300 B2 * 5/2005 Zhou .................... H01R 13/052 439/862

(Continued)

FOREIGN PATENT DOCUMENTS

JP 2001-319711 A 11/2001
JP 2006-269418 A 10/2006

(Continued)

OTHER PUBLICATIONS

International Search Report issued in PCT/JP2020/037643; mailed Dec. 1, 2020.

*Primary Examiner* — Abdullah A Riyami
*Assistant Examiner* — Vladimir Imas
(74) *Attorney, Agent, or Firm* — Studebaker & Brackett PC

(57) ABSTRACT

An electrical connector set includes a first substrate having a first conductor, and a first internal terminal having a first mounting portion and a second mounting portion that are mounted on the first conductor of the first substrate and a projecting portion extending in a curved shape between the first mounting portion and the second mounting portion. The electrical connector set further includes a second substrate having a second conductor, and a second internal terminal having a third mounting portion that is mounted on the second conductor of the second substrate and a recessed portion forming the third mounting portion at a bottom portion, in which the projecting portion of the first internal terminal and the recessed portion of the second internal terminal are configured to be fitted to each other.

20 Claims, 11 Drawing Sheets

(58) Field of Classification Search
USPC .......................................................... 439/701
See application file for complete search history.

(56) References Cited

U.S. PATENT DOCUMENTS 7,059,908 B2 * 6/2006 Yamaguchi ........ H01R 13/6583 439/607.17
7,322,855 B2 * 1/2008 Mongold ........... H01R 13/6587 439/607.05
7,828,559 B2 * 11/2010 Chen .................... H01R 12/716 439/74
7,845,958 B2 * 12/2010 Hoshino .............. H01R 12/716 439/74
8,083,527 B2 * 12/2011 Takeuchi ............... H01R 12/73 439/74
8,398,425 B2 * 3/2013 Suzuki ................. H01R 13/631 439/374
8,465,298 B2 * 6/2013 Takeuchi ........... H01R 13/6275 439/74
8,562,379 B2 * 10/2013 Miyazaki ............. H01R 12/716 439/74
8,845,339 B2 * 9/2014 Ono ....................... H01R 12/73 439/74
9,124,011 B2 * 9/2015 Miyazaki ........... H01R 13/6271
9,225,086 B2 * 12/2015 Takeuchi ............. H01R 12/716
9,350,095 B2 * 5/2016 Arichika ............ H01R 13/6271
10,396,479 B2 * 8/2019 Hoshiba ............... H01R 12/716
10,446,985 B2 * 10/2019 Ooi .................... H01R 13/6471
10,644,419 B2 * 5/2020 Ishida .................. H01R 12/716
10,651,599 B2 * 5/2020 Hashiguchi ............ H01R 13/11
10,784,616 B2 * 9/2020 Gondo ................... H01R 13/41
11,095,059 B2 * 8/2021 Gondo ................. H01R 12/707
11,476,601 B2 * 10/2022 Oosaka ................ H01R 12/716
11,721,921 B2 * 8/2023 Gondo ................... H01R 24/00 439/74
2013/0210270 A1 * 8/2013 Takeuchi ............... H01R 12/73 439/488
2013/0330970 A1 * 12/2013 Hirata ................ H01R 12/7094 439/620.01
2015/0079853 A1 * 3/2015 Tsai ....................... H01R 12/73 439/751
2019/0280409 A1 * 9/2019 Hoshiba ............... H01R 12/716
2020/0067217 A1 * 2/2020 Ashibu ................ H01R 12/716
2022/0094113 A1 * 3/2022 Mamuro ............ H01R 13/6585
2022/0140512 A1 * 5/2022 Amemori ............. H01R 13/658 439/259

FOREIGN PATENT DOCUMENTS

JP 2013-114950 A 6/2013
JP 2015-008053 A 1/2015
JP 2015-211031 A 11/2015
JP 2016-152083 A 8/2016
JP 2017-212035 A 11/2017
JP 2018-116925 A 7/2018
JP 2020-149926 A 9/2020

* cited by examiner

ELECTRICAL CONNECTOR SET

CROSS-REFERENCE TO RELATED APPLICATIONS

This application claims benefit of priority to International Patent Application No. PCT/JP2020/037643, filed Oct. 2, 2020, and to Japanese Patent Application No. 2019-187604, filed Oct. 11, 2019, the entire contents of each are incorporated herein by reference.

BACKGROUND

Technical Field

The present disclosure relates to an electrical connector set.

Background Art

An electrical connector set configured by fitting a first connector and a second connector is known, as described, for example, in Japanese Unexamined Patent Application Publication No. 2018-116925.

The first connector in Japanese Unexamined Patent Application Publication No. 2018-116925 includes a plurality of first internal terminals and an insulating housing that holds the plurality of first internal terminals. Each of the first internal terminals is connected to an electrode of a circuit board by soldering.

Similarly, the second connector includes a plurality of second internal terminals and an insulating housing that holds the plurality of second internal terminals. Each of the second internal terminals is connected to an electrode of a circuit board by soldering.

SUMMARY

There is a need to further improve the electrical characteristics of an electrical connector set.

Thus, the present disclosure provides an electrical connector set with improved electrical characteristics.

Accordingly, an electrical connector set according to the present disclosure includes a first substrate having a first conductor, and a first internal terminal having a first mounting portion and a second mounting portion that are mounted on the first conductor of the first substrate and a projecting portion extending in a curved shape between the first mounting portion and the second mounting portion. The electrical connector set further includes a second substrate having a second conductor, and a second internal terminal having a third mounting portion that is mounted on the second conductor of the second substrate and a recessed portion forming the third mounting portion at a bottom portion, in which the projecting portion of the first internal terminal and the recessed portion of the second internal terminal are configured to be fitted to each other.

According to the present disclosure, an electrical connector set with improved electrical characteristics can be provided.

DETAILED DESCRIPTION

Figure 1A:
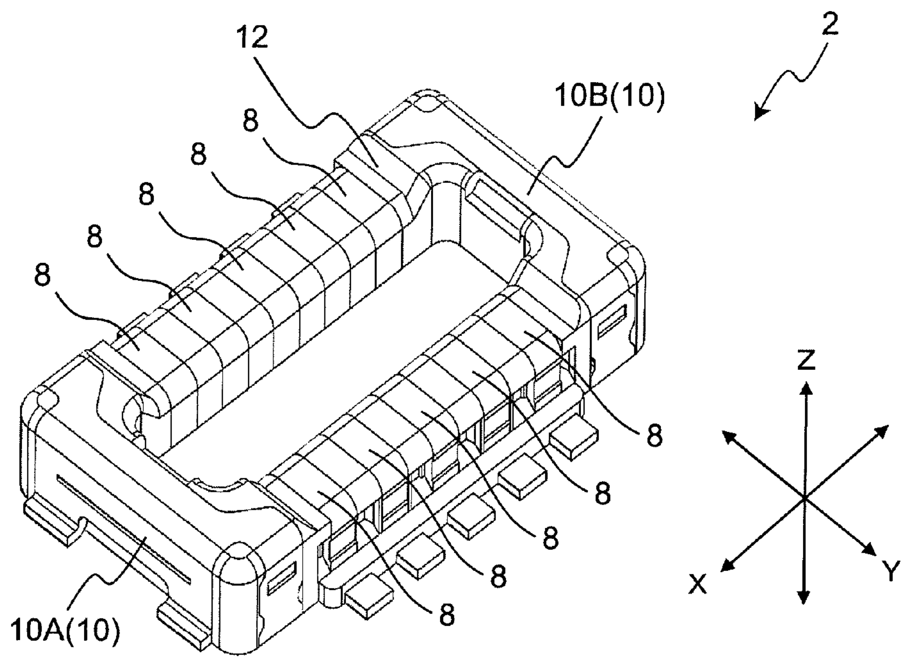
FIG. 1A is a perspective view of an upper surface side of a first connector according to an embodiment.

According to a first aspect of the present disclosure, there is provided an electrical connector set including a first substrate having a first conductor, and a first internal terminal having a first mounting portion and a second mounting portion that are mounted on the first conductor of the first substrate and a projecting portion extending in a curved shape between the first mounting portion and the second mounting portion. The electrical connector set further includes a second substrate having a second conductor, a second internal terminal having a third mounting portion that is mounted on the second conductor of the second substrate and a recessed portion forming the third mounting portion at a bottom portion, in which the projecting portion of the first internal terminal and the recessed portion of the second internal terminal are configured to be fitted to each other.

According to such a configuration, since the first internal terminal has two mounting portions, it is possible to disperse the electricity flowing through the first internal terminal compared to a case in which the first internal terminal has only one mounting portion. Thus, when the internal terminals are connected to a power supply, the current is dispersed instead of concentrated, thereby suppressing heat generation due to overcurrent. Further, when the internal terminals are connected to the ground, the potential changes of the internal terminals as the ground terminals can be suppressed, improving the shielding properties. In this way, the electrical characteristics of the electrical connector set can be improved.

According to a second aspect of the present disclosure, there is provided the electrical connector set according to the first aspect, in which the second internal terminal has a first portion rising from the bottom portion of the recessed portion on one side and a second portion rising from the bottom portion on another side, and the first portion is a portion having a free end. According to such a configuration, the degree of freedom in design is improved by making the first portion the portion having a free end.

According to a third aspect of the present disclosure, there is provided the electrical connector set according to the second aspect, further including a fourth mounting portion with which the second internal terminal is mounted on the second conductor of the second substrate separately from the third mounting portion, in which the second internal terminal further has a projecting portion to be connected to the second portion and a third portion extending from the projecting portion to the fourth mounting portion. According to such a configuration, since the second internal terminal has two mounting portions, the electricity flowing through the second internal terminal can be dispersed similarly to the first internal terminal, thereby improving the electrical characteristics of the electrical connector set.

According to a fourth aspect of the present disclosure, there is provided the electrical connector set according to the third aspect, further including an insulator holding the second internal terminal, in which the third portion of the second internal terminal has a wide portion with a large width, and the insulator has a first notch that is recessed to accommodate the wide portion of the third portion. According to such a configuration, by providing the first notch in the insulator to accommodate the wide portion of the second internal terminal, the second internal terminal can be fixed to the insulator.

According to a fifth aspect of the present disclosure, there is provided the electrical connector set according to the fourth aspect, in which the insulator further has a second notch that is recessed outward for the projecting portion of the second internal terminal. According to such a configuration, by providing the second notch in the insulator, it is possible to secure a space in which the projecting portion of the second internal terminal is pushed outward and deformed when the first internal terminal and the second internal terminal are fitted to each other.

According to a sixth aspect of the present disclosure, there is provided the electrical connector set according to any one of the second to fifth aspects, in which a width of the first portion of the second internal terminal is larger than a width of the second portion of the second internal terminal. According to such a configuration, by making the width of the first portion, which is the portion having a free end, larger than the width of the second portion, the spring constant of the portion having a free end can be increased, so that the value of the spring constant of the portion having a free end can be brought closer to the values of the spring constants of the second portion and the projecting portion connected to the second portion. This makes it easier to secure contact points with the first internal terminal.

According to a seventh aspect of the present disclosure, there is provided the electrical connector set according to any one of the first to sixth aspects, in which the first and second conductors are conductors that are connected to a power supply. According to such a configuration, when the internal terminals are connected to the power supply, since the first internal terminal has two mounting portions, it is possible to disperse the electricity flowing through the internal terminals and suppress heat generation due to overcurrent compared to a case in which the first internal terminal has only one mounting portion.

According to an eighth aspect of the present disclosure, there is provided the electrical connector set according to any one of the first to sixth aspects, in which the first and second conductors are conductors that are connected to the ground. According to such a configuration, when the internal terminals are connected to the ground, since the first internal terminal includes two mounting portions, the electricity flowing through the internal terminals can be dispersed and the potential changes as the ground terminals can be suppressed compared to a case in which the first internal terminal has only one mounting portion, thereby improving the shielding properties.

Hereinafter, an embodiment of the present disclosure will be described in detail with reference to the drawings.

Embodiment

Figure 1B:
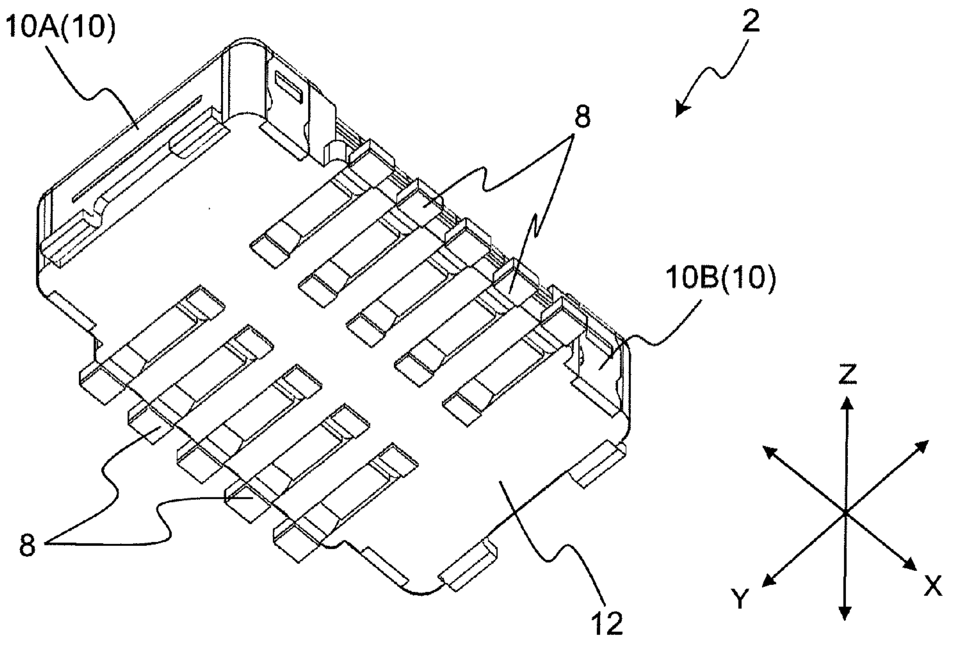
FIG. 1B is a perspective view of a lower surface side of the first connector according to the embodiment.
Figure 1C:
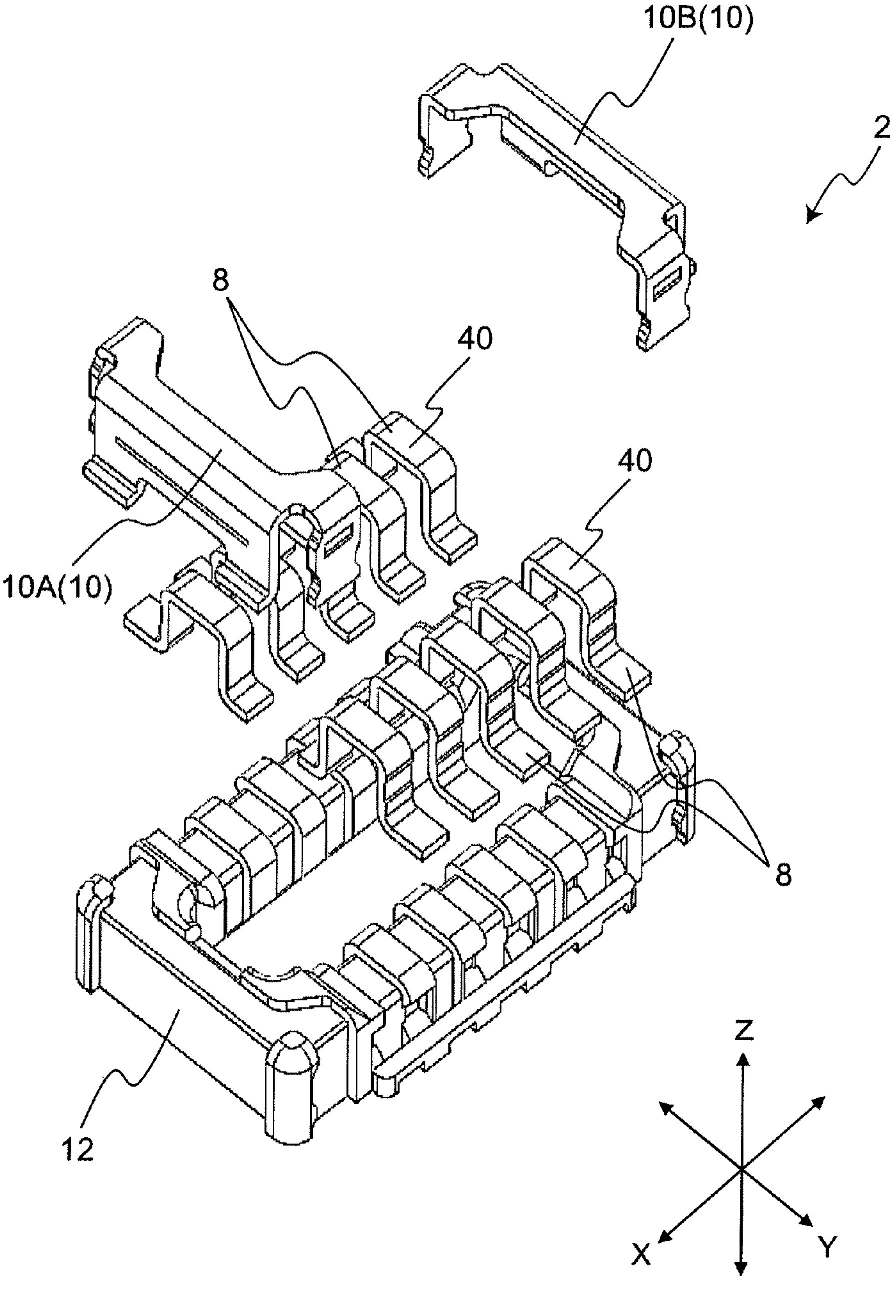
FIG. 1C is an exploded perspective view of the first connector according to the embodiment.
Figure 2A:
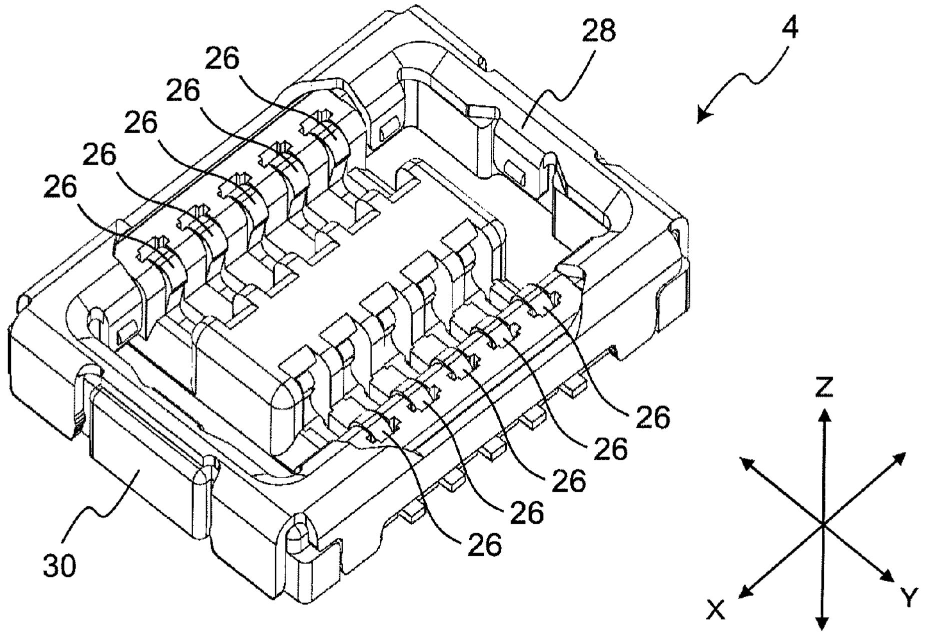
FIG. 2A is a perspective view of an upper surface side of a second connector according to the embodiment.
Figure 2B:
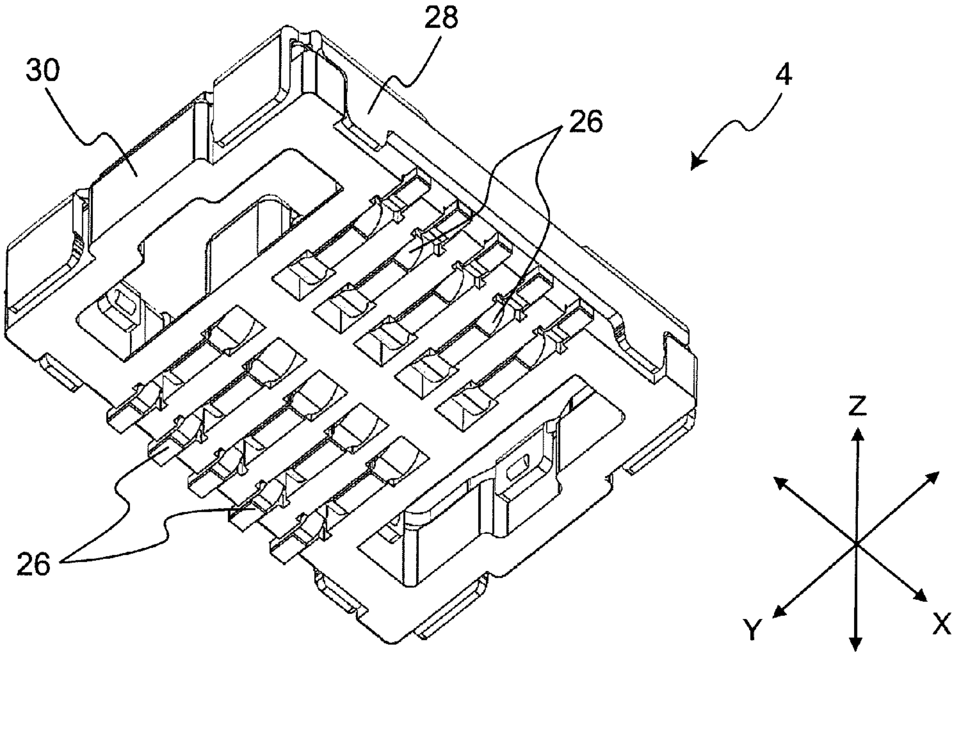
FIG. 2B is a perspective view of a lower surface side of the second connector according to the embodiment.
Figure 2C:
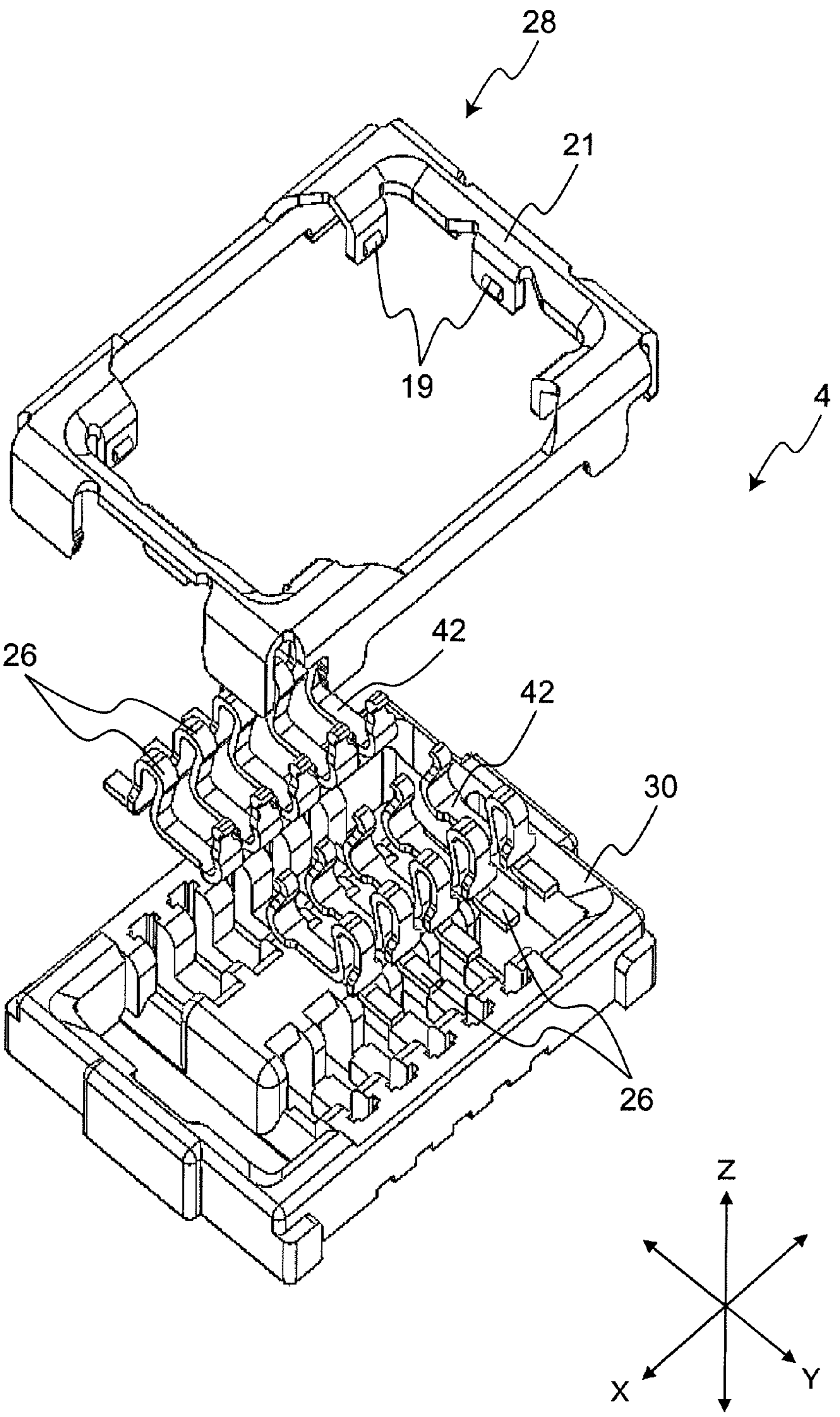
FIG. 2C is an exploded perspective view of the second connector according to the embodiment.
Figure 3A:
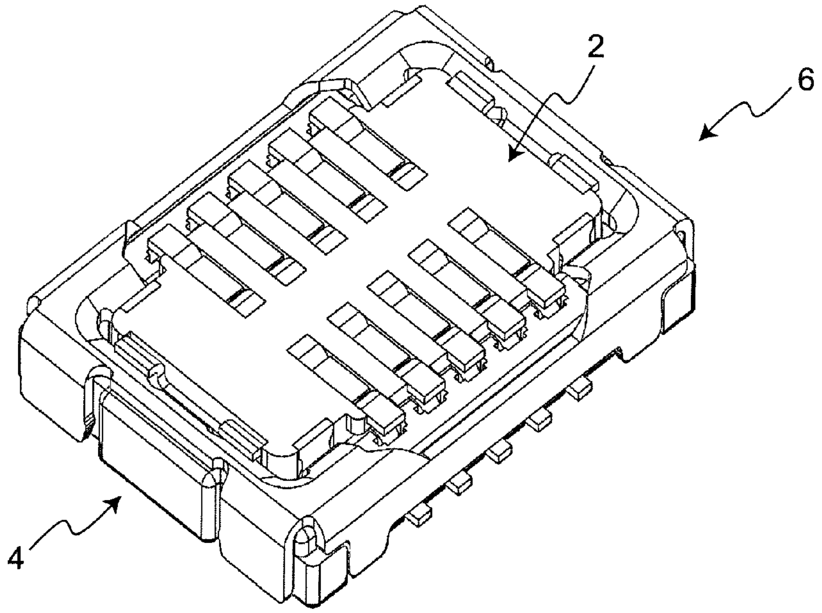
FIG. 3A is a perspective view of an electrical connector set according to the embodiment as viewed from the first connector side.
Figure 3B:
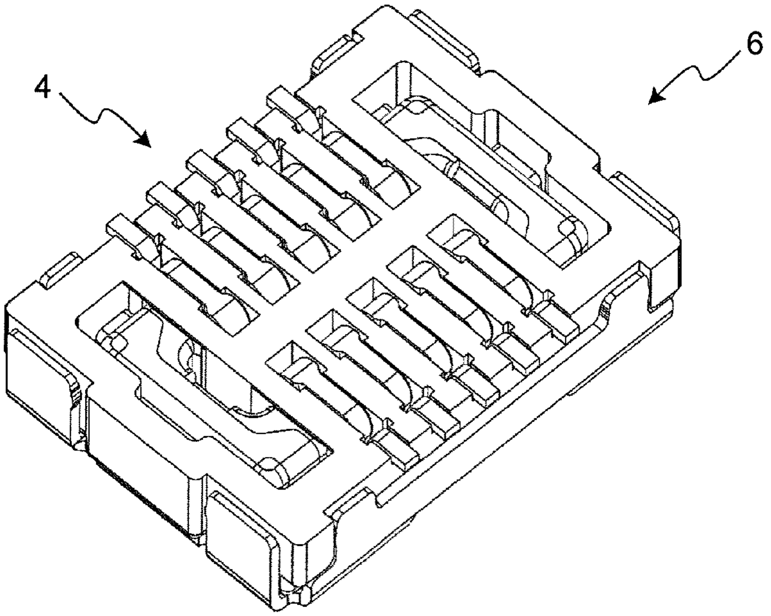
FIG. 3B is a perspective view of the electrical connector set according to the embodiment as viewed from the second connector side.

FIGS. 1A to 1C are diagrams illustrating a first connector 2 according to the embodiment. FIGS. 2A to 2C are diagrams illustrating a second connector 4 according to the embodiment. FIGS. 3A and 3B are perspective views illustrating an electrical connector set 6.

By fitting the first connector 2 illustrated in FIGS. 1A to 1C and the second connector 4 illustrated in FIGS. 2A to 2C to each other, the electrical connector set 6 illustrated in FIGS. 3A and 3B is configured. In the embodiment, the first connector 2 is a male multi-pole connector, and the second connector 4 is a female multi-pole connector.

Figure 1D:
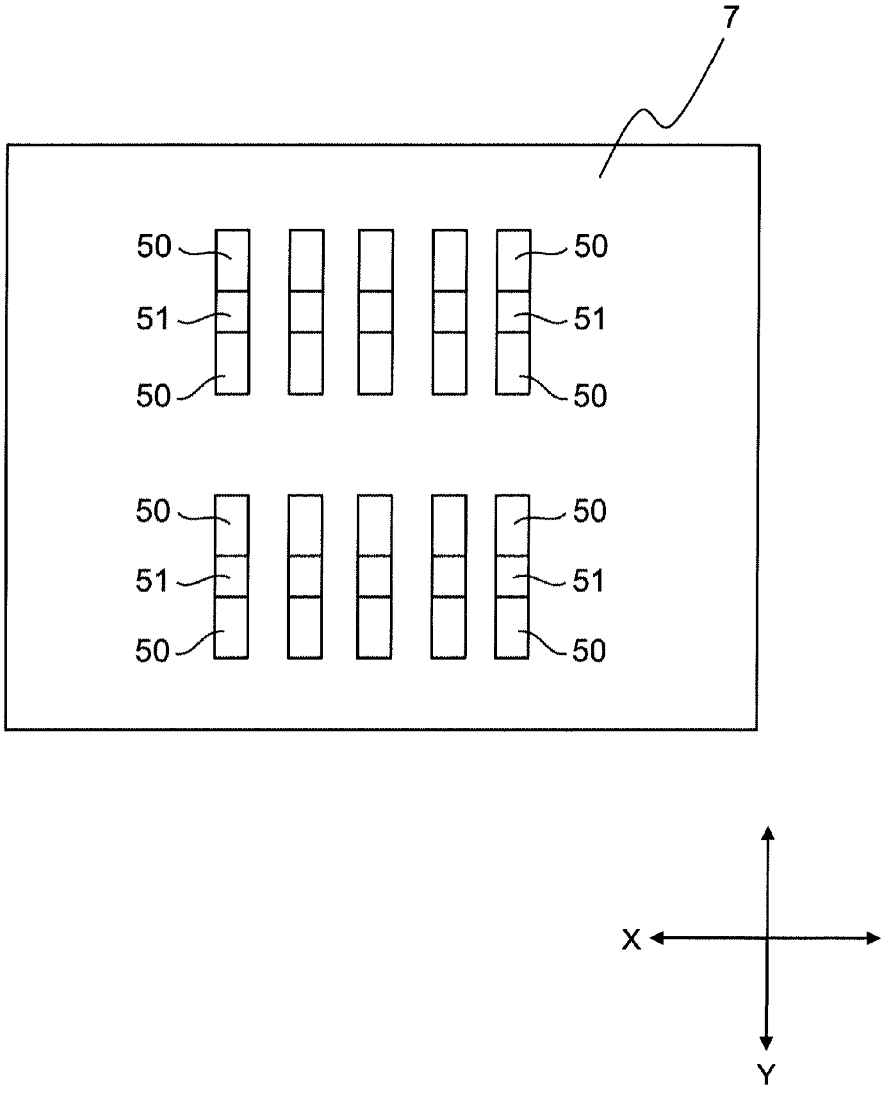
FIG. 1D is a schematic plan view of a first substrate according to the embodiment.

The first connector 2 will be described with reference to FIGS. 1A to 1D. FIG. 1A is a perspective view of an upper surface side of the first connector 2, FIG. 1B is a perspective view of a lower surface side of the first connector 2, and FIG. 1C is an exploded perspective view of the first connector 2. FIG. 1D is a schematic plan view illustrating a first substrate 7 on which the first connector 2 is mounted.

In FIGS. 1A to 1D, a length direction (longer direction) of the first connector 2 is defined as an X direction, a width direction (shorter direction) thereof is defined as a Y direction, and a height direction (up-down direction) thereof orthogonal to the longer direction and the shorter direction thereof is defined as a Z direction.

As illustrated in FIGS. 1A to 1C, the first connector 2 includes a plurality of first internal terminals 8, a first external terminal 10, and a first insulator 12.

The plurality of first internal terminals 8 are mounted on the first substrate 7 illustrated in FIG. 1D. As illustrated in FIG. 1D, the first substrate 7 has a plurality of first conductors 50. The first conductors 50 are provided in a one-to-one correspondence with the first internal terminals 8, and one first internal terminal 8 is mounted on one first conductor 50. In the embodiment, a resist 51 is provided on a surface of a central portion of the first conductor 50, and the first conductor 50 is divided into two portions. One first internal terminal 8 is mounted on one first conductor 50 at the two portions. This allows the electricity flowing through the first internal terminal 8 to be dispersed compared to a case in which one first internal terminal 8 is mounted on the first conductor 50 at only one portion. Details will be described later. Note that in FIGS. 1A, 1B, and 1C, the first substrate 7 is not illustrated.

The first internal terminal 8 is a terminal that is fitted into and electrically connected to a second internal terminal 26

(see FIGS. 2A to 2C) of the second connector 4 described later. The first internal terminals 8 are each made of the same conductive material (e.g., phosphor bronze). Due to the presence of the plurality of first internal terminals 8, the first connector 2 illustrated in FIGS. 1A to 1C is referred to as a "multi-pole" connector.

The plurality of first internal terminals 8 are arranged so as to be spaced apart from each other along the X direction. In the embodiment, two rows of the first internal terminals 8 extending in the X direction are spaced apart in the Y direction.

As illustrated in FIG. 1C and the like, the first internal terminal 8 is configured as a male terminal. The male terminal has a projecting portion 40 and is fitted into a recessed portion 42 (see FIG. 2C) of the second internal terminal 26 at the projecting portion 40.

The first external terminal 10 is a terminal that is fitted into and electrically connected to a second external terminal 28 (see FIGS. 2A to 2C) of the second connector 4 described later. The first external terminal 10 functions as a ground terminal. The first external terminal 10 is made of the same conductive material (e.g., phosphor bronze) as the first internal terminal 8 described above.

The first external terminal 10 is configured as a male terminal and is fitted into the second external terminal 28, which is a female terminal. Since the first external terminal 10 is a male type, the first connector 2 illustrated in FIGS. 1A to 1C is referred to as a "male type" connector.

The first external terminal 10 according to the embodiment includes a first portion 10A and a second portion 10B spaced apart from each other in the X direction. The first portion 10A and the second portion 10B are provided so as to sandwich the plurality of first internal terminals 8 in the X direction. Not limited to such a configuration, the first portion 10A and the second portion 10B may be configured as an integral part.

The first insulator 12 illustrated in FIGS. 1A to 1C is a member that holds the plurality of first internal terminals 8 and the first external terminal 10 in a state of being electrically insulated from each other. The first insulator 12 is made of, for example, a resin (e.g., a liquid crystal polymer), which is an insulating material.

Figure 2D:
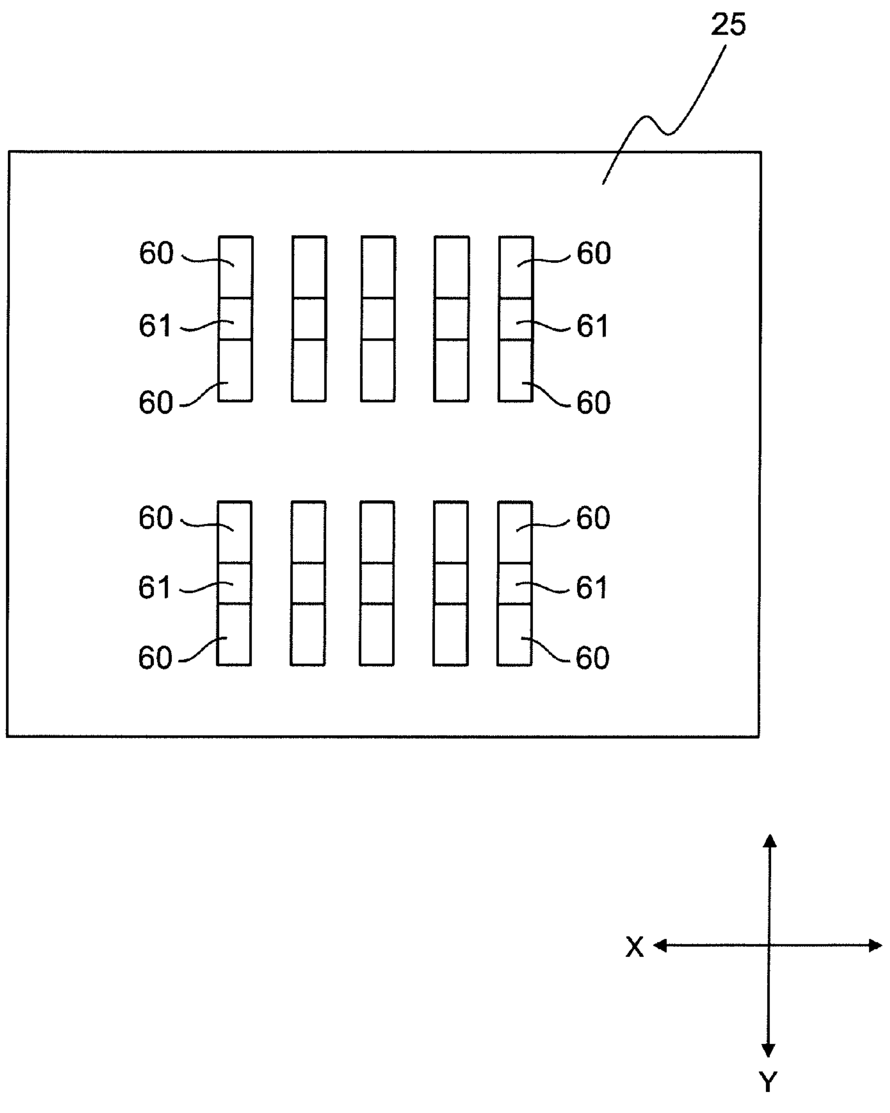
FIG. 2D is a schematic plan view of a second substrate according to the embodiment.

Next, the second connector 4 will be described with reference to FIGS. 2A to 2D. FIG. 2A is a perspective view of an upper surface side of the second connector 4, FIG. 2B is a perspective view of a lower surface side of the second connector 4, and FIG. 2C is an exploded perspective view of the second connector 4. FIG. 2D is a schematic plan view illustrating a second substrate 25 on which the second connector 4 is mounted.

In FIGS. 2A to 2D, similarly to the first connector 2 described above, a length direction (longer direction) of the second connector 4 is defined as the X direction, a width direction (shorter direction) thereof is defined as the Y direction, and a height direction (up-down direction) thereof is defined as the Z direction.

As illustrated in FIGS. 2A to 2C, the second connector 4 includes a plurality of second internal terminals 26, the second external terminal 28, and a second insulator 30.

The plurality of second internal terminals 26 are mounted on the second substrate 25 illustrated in FIG. 2D. As illustrated in FIG. 2D, the second substrate 25 has a plurality of second conductors 60. The second conductors 60 are provided in a one-to-one correspondence with the second internal terminals 26, and one second internal terminal 26 is mounted on one second conductor 60. In the embodiment, a resist 61 is provided on a surface of a central portion of the second conductor 60, and the second conductor 60 is divided into two portions. One second internal terminal 26 is mounted on one second conductor 60 at the two portions. This allows the electricity flowing through the second internal terminal 26 to be dispersed compared to a case in which one second internal terminal 26 is mounted on the second conductor 60 at only one portion. Details will be described later. Note that in FIGS. 2A, 2B, and 2C, the second substrate 25 is not illustrated.

The second internal terminal 26 is a terminal that is fitted to and electrically connected to the first internal terminal 8 of the first connector 2 illustrated in FIGS. 1A to 1C. The second internal terminals 26 are each made of the same conductive material (e.g., phosphor bronze). Due to the presence of the plurality of second internal terminals 26, the connector illustrated in FIGS. 2A to 2C is referred to as a "multi-pole" connector.

The plurality of second internal terminals 26 are arranged so as to be spaced apart from each other along the X direction. In the embodiment, two rows of the second internal terminals 26 extending in the X direction are spaced apart in the Y direction.

As illustrated in FIG. 2C and the like, the second internal terminal 26 is configured as a female terminal. The female terminal has the recessed portion 42, and is fitted to the projecting portion 40 (see FIG. 1C) of the first internal terminal 8 at the recessed portion 42.

The second external terminal 28 is a terminal that is fitted to and electrically connected to the first external terminal 10 of the first connector 2 illustrated in FIGS. 1A to 1C. The second external terminal 28 functions as a ground terminal. The second external terminal 28 is made of the same conductive material (e.g., phosphor bronze) as the second internal terminal 26 described above.

The second external terminal 28 is configured as a female terminal and has a function of guiding the first external terminal 10, which is a male terminal, inward. As illustrated in FIG. 2C, the second external terminal 28 includes a guide portion 21, which is an inclined surface for guiding the first external terminal 10. Since the second external terminal 28 is a female type, the second connector 4 illustrated in FIGS. 2A to 2C is referred to as a "female type" connector.

The second external terminal 28 has a shape that surrounds the plurality of second internal terminals 26. By surrounding the second internal terminals 26 with the second external terminal 28, it is possible to suppress generation of noise due to the second internal terminals 26 and the first internal terminals 8.

In the embodiment, the second external terminal 28 is configured as a single annular member. Not limited to such a shape, the second external terminal 28 may be constituted of a plurality of separate members.

The second external terminal 28 further includes a locking portion 19. The locking portion 19 is a projection that functions as a stopper for the first external terminal 10 when the first external terminal 10 is fitted into the second external terminal 28. When the first external terminal 10 and the second external terminal 28 are fitted to each other, the locking portion 19 does not necessarily have to be in contact with the first external terminal 10.

The second insulator 30 illustrated in FIGS. 2A to 2C is a member that holds the second internal terminals 26 and the second external terminal 28 described above in a state of being electrically insulated from each other. The second insulator 30 is made of, for example, a resin (e.g., a liquid crystal polymer), which is an insulating material.

The electrical connector set 6 illustrated in FIGS. 3A and 3B is configured by fitting the male first connector 2 described above into the female second connector 4 described above. FIG. 3A is a perspective view of the electrical connector set 6 as viewed from the first connector 2 side, and FIG. 3B is a perspective view of the electrical connector set 6 as viewed from the second connector 4 side.

When fitting the first connector 2 into the second connector 4, the first external terminal 10 (male type) of the first connector 2 is fitted into the second external terminal 28 (female type) of the second connector 4. Then, the projecting portion 40 (male type) of the first internal terminal 8 of the first connector 2 is fitted into the recessed portion 42 (female type) of the second internal terminal 26 of the second connector 4. However, the order of fitting can be changed as appropriate.

In the electrical connector set 6 having the above-described configuration, the mounting structure for mounting the first internal terminal 8 of the first connector 2 on the first substrate 7 and the mounting structure for mounting the second internal terminal 26 of the second connector 4 on the second substrate 25 will be described with reference to FIGS. 4A, 4B, 5A, and 5B.

Figure 4A:
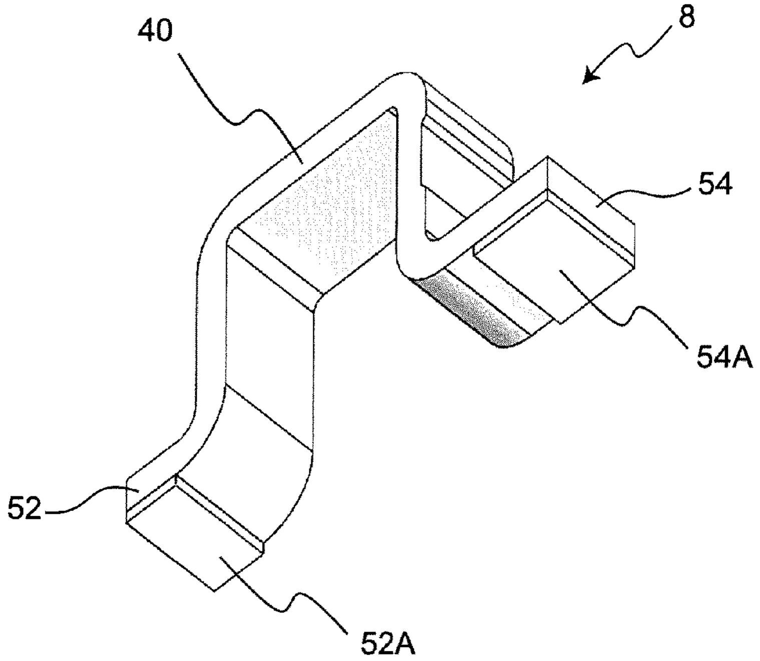
FIG. 4A is a perspective view of a first internal terminal according to the embodiment as viewed from bellow.
Figure 4B:
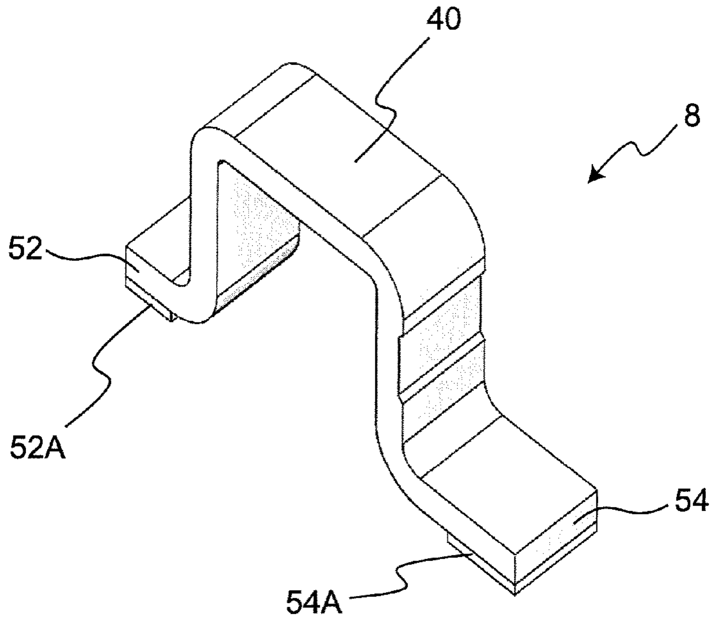
FIG. 4B is a perspective view of the first internal terminal according to the embodiment as viewed from above.

FIG. 4A is a perspective view of the first internal terminal 8 as viewed from below, and FIG. 4B is a perspective view of the first internal terminal 8 as viewed from above.

As illustrated in FIGS. 4A and 4B, the first internal terminal 8 is provided with a first mounting portion 52 and a second mounting portion 54. The first mounting portion 52 is one end portion of the first internal terminal 8, and the second mounting portion 54 is another end portion of the first internal terminal 8. The first mounting portion 52 is mounted on the first conductor 50 of the first substrate 7 with a first mounting member 52A interposed therebetween, and the second mounting portion 54 is mounted on the first conductor 50 with a second mounting member 54A interposed therebetween. Both the first mounting member 52A and the second mounting member 54A are members for mounting the first internal terminal 8 on the first conductor 50. In the embodiment, the first mounting member 52A and the second mounting member 54A are made of solder. In FIGS. 4A and 4B, the first mounting member 52A and the second mounting member 54A are schematically illustrated, and are actually spread out after being melted.

As illustrated in FIGS. 4A and 4B, the first internal terminal 8 has the projecting portion 40. Both ends of the projecting portion 40 are bent to form the first mounting portion 52 and the second mounting portion 54. The first mounting member 52A and the second mounting member 54A are in contact with bottom surfaces of the first mounting portion 52 and the second mounting portion 54, respectively.

By providing the two mounting portions 52 and 54 for mounting the first internal terminal 8 on the first conductor 50, it is possible to disperse the electricity flowing through the first internal terminal 8 compared to a case in which only one mounting portion is provided.

When the electrical connector set 6 is in use, the first conductor 50 is connected to either a power supply, the ground, or a signal line. When the first conductor 50 is connected to the power supply, heat generation due to overcurrent at the first internal terminal 8 can be suppressed by dispersing the electricity flowing through the first internal terminal 8. In addition, when the first conductor 50 is connected to the ground, it is possible to suppress the potential change of the first internal terminal 8 by dispersing the electricity flowing through the first internal terminal 8, thereby improving the shielding properties of the first internal terminal 8 as a ground terminal. In this way, the electrical characteristics of the electrical connector set 6 can be improved.

When only one mounting portion is provided in the first internal terminal 8, due to the characteristics of conductor resistance, the current density is concentrated in the shortest path, which makes it easy to generate heat, so there is a possibility that the electric connector set 6 cannot be used for applications in which a large current flows, such as a power supply. On the other hand, in the first internal terminal 8 of the embodiment, heat generation is suppressed by providing the two mounting portions 52 and 54. Thus, the electric connector set 6 can also be used for large current applications. In this way, the electric connector set 6 can be used for both large current applications and high frequency applications. In addition, since a large current can be applied without increasing the width of the first internal terminal 8, the dimension of the first connector 2 in the longer direction X can be reduced, and the number of members can be reduced, thereby reducing costs.

Figure 5A:
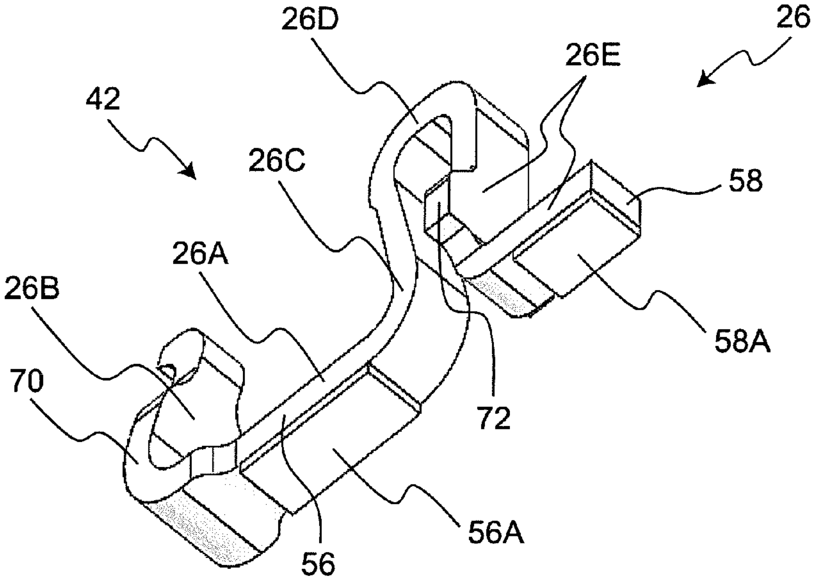
FIG. 5A is a perspective view of a second internal terminal according to the embodiment as viewed from below.
Figure 5B:
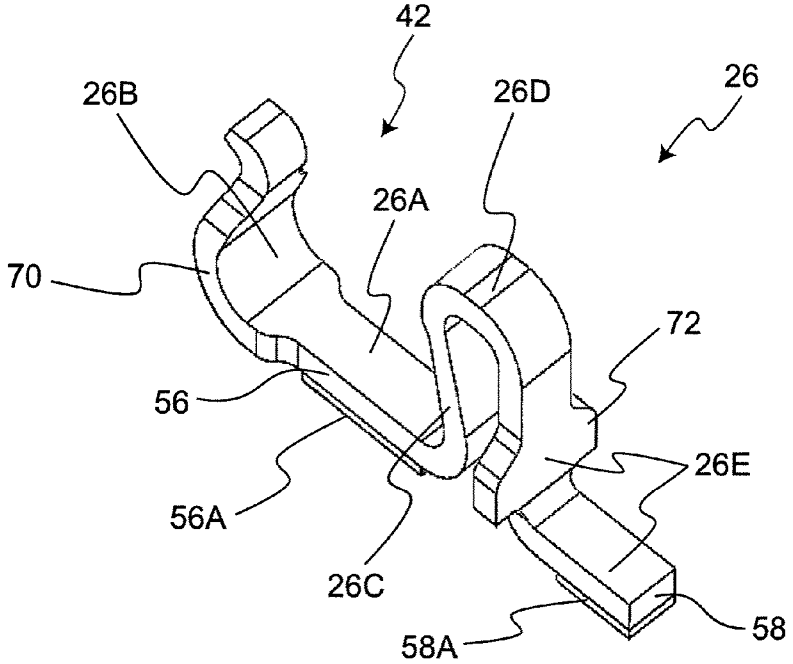
FIG. 5B is a perspective view of the second internal terminal according to the embodiment as viewed from above.

FIG. 5A is a perspective view of the second internal terminal 26 as viewed from below, and FIG. 5B is a perspective view of the second internal terminal 26 as viewed from above.

As illustrated in FIGS. 5A and 5B, the second internal terminal 26 is provided with a third mounting portion 56 and a fourth mounting portion 58. The third mounting portion 56 is mounted on the second conductor 60 of the second substrate 25 with a third mounting member 56A interposed therebetween, and the fourth mounting portion 58 is mounted on the second conductor 60 with a fourth mounting member 58A interposed therebetween. Both the third mounting member 56A and the fourth mounting member 58A are members for mounting the second internal terminal 26 on the second conductor 60. In the embodiment, the third mounting member 56A and the fourth mounting member 58A are made of solder. In FIGS. 5A and 5B, the third mounting member 56A and the fourth mounting member 58A are schematically illustrated similarly to FIGS. 4A and 4B.

As illustrated in FIGS. 5A and 5B, the second internal terminal 26 further has a bottom portion 26A, a first portion 26B, a second portion 26C, a projecting portion 26D, and a third portion 26E.

The bottom portion 26A, the first portion 26B, and the second portion 26C are portions constituting the recessed portion 42 of the second internal terminal 26. The bottom portion 26A is a bottom surface of the recessed portion 42 and constitutes the third mounting portion 56. The third mounting member 56A is in contact with a bottom surface of the third mounting portion 56. The first portion 26B is a portion rising from the bottom portion 26A on one side, and the second portion 26C is a portion rising from the bottom portion 26A on another side. A tip end of the first portion 26B is not connected to any other member and is a free end, and the first portion 26B is a portion having a free end. In other words, one end of the first portion 26B is not connected to any other member, and another end thereof is connected to the bottom portion 26A, which is a portion to be mounted on the second conductor 60 of the second substrate 25. The second portion 26C is not a portion having a free end, but is connected to the bottom portion 26A and the projecting portion 26D.

The projecting portion 26D is a portion that projects in a direction opposite to the direction in which the recessed portion 42 is recessed, that is, upward. The projecting portion 26D has a smoothly curved shape and is connected to the third portion 26E. The third portion 26E extends from the projecting portion 26D to the fourth mounting portion 58. The fourth mounting member 58A is in contact with a bottom surface of the fourth mounting portion 58.

Thus, by providing the two mounting portions 56 and 58 for mounting the second internal terminal 26 on the second conductor 60, the same effect as that of the first internal terminal 8 can be achieved, thereby improving the electrical characteristics of the electrical connector set 6.

As described above, according to the electrical connector set 6 of the embodiment, the first internal terminal 8 has the first mounting portion 52 and the second mounting portion 54 that are mounted on the first conductor 50 of the first substrate 7, and the second internal terminal 26 has the third mounting portion 56 that is mounted on the second conductor 60 of the second substrate 25. According to such a configuration, since the first internal terminal 8 has the two mounting portions 52 and 54, it is possible to disperse the electricity flowing through the first internal terminal 8 compared to a case in which the first internal terminal 8 has only one mounting portion. In this embodiment, the second internal terminal 26 also has the two mounting portions 56 and 58. However, by providing the two mounting portions 52 and 54 in the first internal terminal 8, an effect of dispersing the electricity flowing through the electrical connector set 6 can be achieved regardless of the number of mounting portions of the second internal terminal 26, for example, even when only the third mounting portion 56 is provided.

Here, in the second internal terminal 26 of the embodiment, the width is locally changed. To be specific, the bottom portion 26A, the second portion 26C, and the projecting portion 26D have uniformly the same width, whereas the first portion 26B and the third portion 26E have wide portions 70 and 72 that are locally increased in width, respectively.

The wide portion 70 of the first portion 26B is provided to increase the spring constant of the first portion 26B. Since one side of the first portion 26B is a free end, the first portion 26B tends to have a smaller spring constant and be softer than the portions in which both sides are fixed to the third mounting portion 56 and the fourth mounting portion 58, such as the second portion 26C and the projecting portion 26D. On the other hand, the projecting portion 26D is less deformable and has a higher spring constant than the portion having a free end. Thus, when the second internal terminal 26 is fitted to the first internal terminal 8, the contact pressure tends to be weaker on the first portion 26B, which is the portion having a free end. At this time, when the width of the entire second internal terminal 26 is increased in order to increase the spring constant, the projecting portion 26D becomes less deformable, making it difficult to fit the second internal terminal 26 to the first internal terminal 8. Thus, the spring constant of the second internal terminal 26 is locally increased by providing the wide portion 70 in the first portion 26B while keeping the width of the second portion 26C and the projecting portion 26D the same as the width of the bottom portion 26A. This allows the spring constant of the first portion 26B to be brought closer to the spring constants of the second portion 26C and the projecting portion 26D, so that all the portions have an equivalent elastic force. According to such a configuration, when the projecting portion 40 of the first internal terminal 8 is fitted into the recessed portion 42 of the second internal terminal 26, forces can be evenly applied to the projecting portion 40 of the first internal terminal 8 so as to sandwich the projecting portion 40 from both sides in the Y direction. As a result, accurate fitting can be achieved. In this way, by selectively increasing the thickness of the first portion 26B, which is the portion having a free end, to bring the spring constant closer to the spring constant of the projecting portion 26D, appropriate fitting can be achieved while maintaining the contact pressure.

As described above, by making the width of the first portion 26B, which is the portion having a free end, larger than the width of the second portion 26C, the value of the spring constant of the first portion 26B can be brought closer to the values of the spring constants of the second portion 26C and the projecting portion 26D. When setting the widths of the first portion 26B and the second portion 26C, the average width or the maximum width of the first portion 26B should be set to be larger than the average width or the maximum width of the second portion 26C.

On the other hand, the wide portion 72 of the third portion 26E is provided for fixing the second internal terminal 26 to the second insulator 30 described above. This will be described in detail with reference to FIGS. 6A and 6B.

Figure 6A:
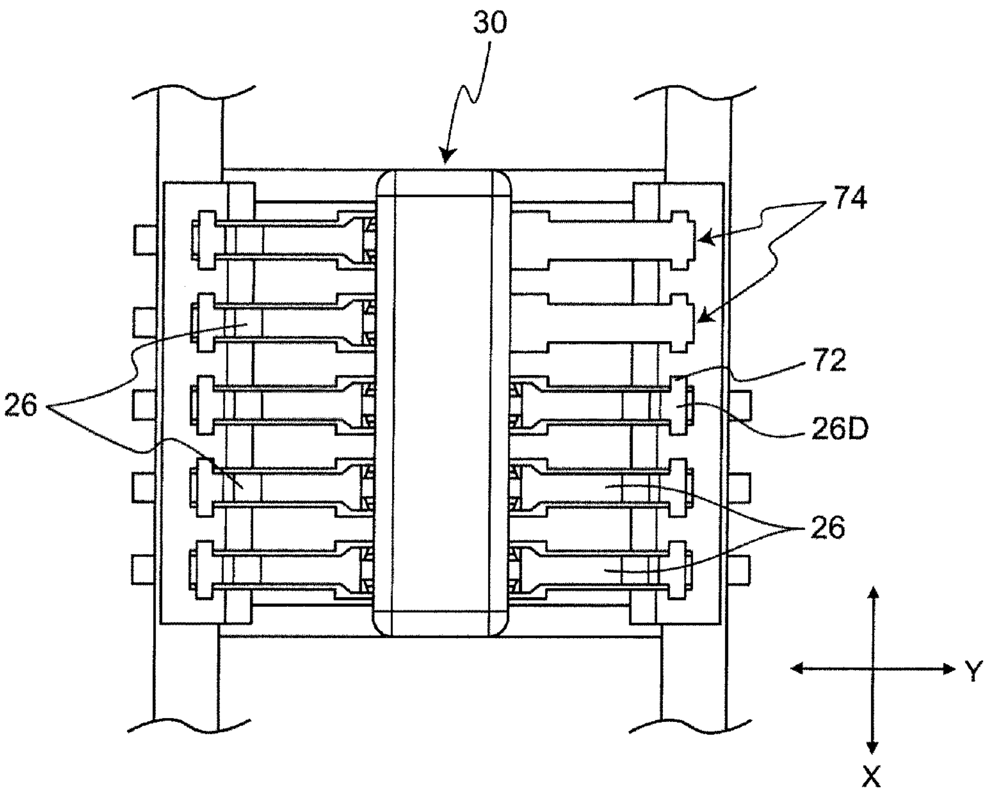
FIG. 6A is a schematic plan view of a second insulator and the second internal terminals according to the embodiment.
Figure 6B:
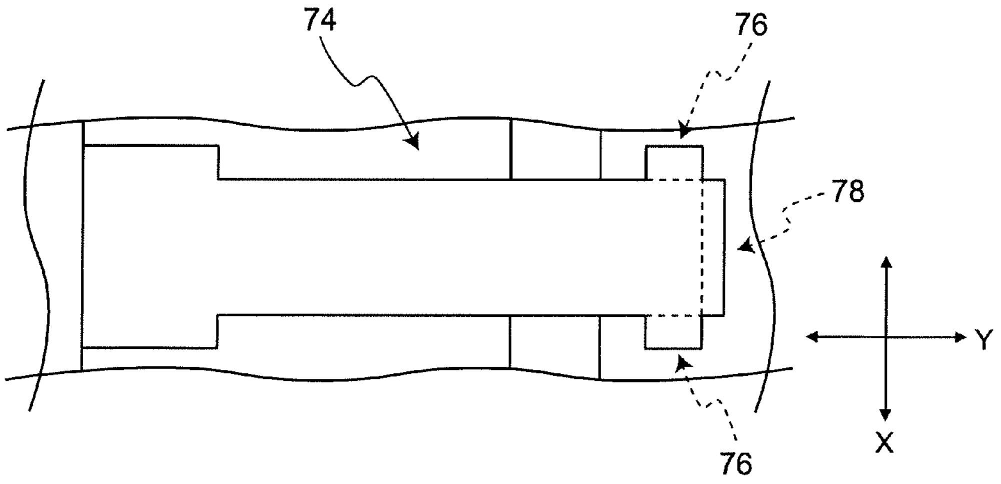
FIG. 6B is a partially enlarged view of FIG. 6A.

FIG. 6A is a plan view of the second insulator 30 and the second internal terminals 26. For the sake of convenience, FIG. 6A illustrates a state in which some of the second internal terminals 26 are removed. FIG. 6B is a partially enlarged view of FIG. 6A.

As illustrated in FIG. 6A, the second insulator 30 is provided with openings 74 for arranging the plurality of second internal terminals 26.

Each of the openings 74 has a first notch 76 and a second notch 78 as illustrated in FIG. 6B.

The first notch 76 is a notch for arranging the wide portion 72 of the second internal terminal 26 described above. The first notch 76 is provided for the second internal terminal 26 as a recessed portion that is recessed outward in the X direction, which is the length direction of the second connector 4. By arranging the wide portion 72 in the first notch 76, the movement of the second internal terminal 26 in the opening 74 in the Y direction can be restricted, so that the second internal terminal 26 can be fixed to the second insulator 30.

The second notch 78 is a notch for receiving the projecting portion 26D of the second internal terminal 26. The second notch 78 is provided for the projecting portion 26D of the second internal terminal 26 as a recessed portion that is recessed outward in the Y direction, which is the width direction of the second connector 4. By providing the second notch 78, it is possible to secure a space in which the projecting portion 26D of the second internal terminal 26 is deformed when the first internal terminal 8 is fitted into the second internal terminal 26 and the projecting portion 26D of the second internal terminal 26 is pushed outward. This allows the second internal terminal 26 to exert a desired elastic force, so that accurate fitting can be achieved.

(Variation)

A variation for the mounting members 52A and MA of the first internal terminal 8 and the mounting members 56A and 58A of the second internal terminal 26 will be described with reference to FIGS. 7A and 7B.

Figure 7A:
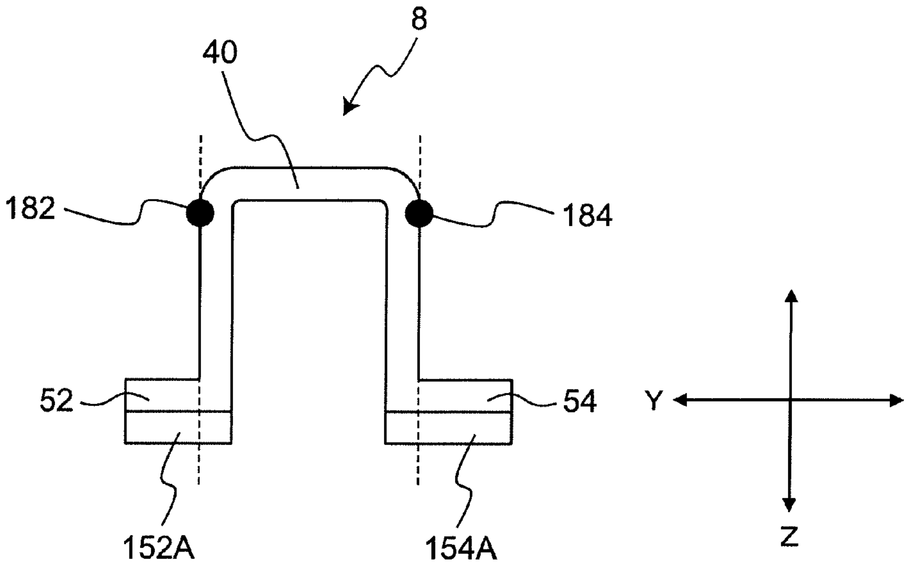
FIG. 7A is a schematic side view illustrating the first internal terminal and first and second mounting members according to a variation.

FIG. 7A is a schematic side view illustrating a first mounting member 152A and a second mounting member 154A of the first internal terminal 8 of the variation.

As illustrated in FIG. 7A, the first mounting member 152A and the second mounting member 154A are set to be longer in the Y direction than the first mounting member 52A and the second mounting member 54A of the embodiment.

Assuming that two contact points of the first internal terminal 8 with the second internal terminal 26 are a first contact point 182 and a second contact point 184, respectively, it is designed that the first contact point 182 overlaps the first mounting member 152A in the Z direction and the second contact point 184 overlaps the second mounting member 154A in the Z direction (see dotted lines).

By arranging the first mounting member 152A and the second mounting member 154A directly below the contact points 182 and 184, respectively, in this manner, the paths of electricity flowing from the first internal terminal 8 to the first mounting member 152A and the second mounting member 154A are shortened compared to a configuration in which no mounting member is present directly below the contact points 182 and 184. By shortening the electrical paths, heat generation can be reduced when the first internal terminal 8 is connected to a power supply, and when the first internal terminal 8 is connected to the ground terminal, the potential change of the ground terminal can be suppressed, improving the shielding properties. Such a design can improve the electrical characteristics of the electrical connector set 6.

Figure 7B:
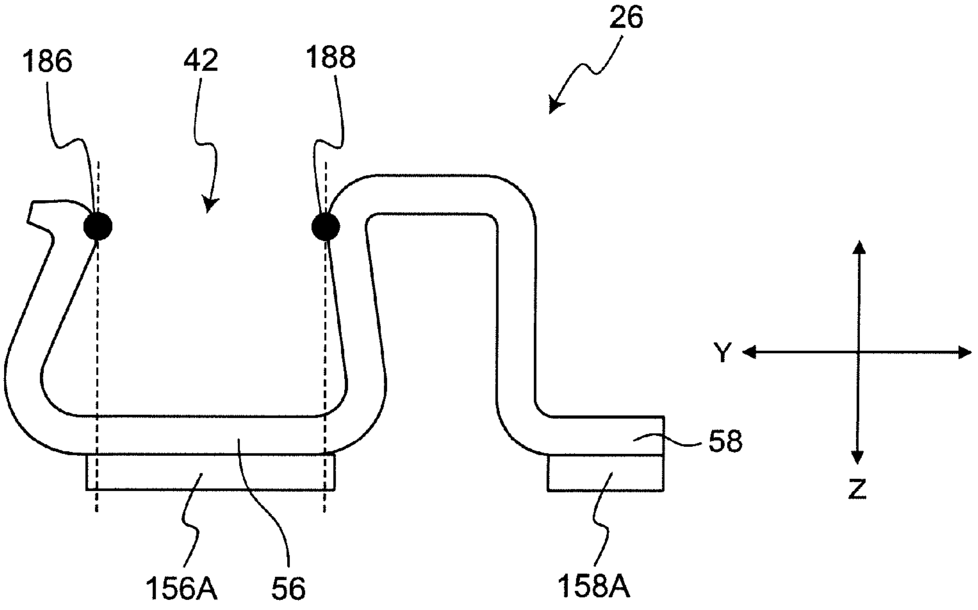
FIG. 7B is a schematic side view illustrating the second internal terminal and third and fourth mounting members according to the variation.

FIG. 7B is a schematic side view illustrating a third mounting member 156A and a fourth mounting member 158A of the second internal terminal 26 of the variation.

As illustrated in FIG. 7B, the third mounting member 156A and the fourth mounting member 158A are set to be longer in the Y direction than the third mounting member 56A and the fourth mounting member 58A of the embodiment.

Assuming that two contact points of the second internal terminal 26 with the first internal terminal 8 are a third contact point 186 and a fourth contact point 188, respectively, both the third contact point 186 and the fourth contact point 188 are designed to overlap the third mounting member 156A in the Z direction (see dotted lines).

By arranging the third mounting member 156A directly below the contact points 186 and 188 in this manner, the paths of electricity flowing from the second internal terminal 26 to the third mounting member 156A are shortened compared to a configuration in which no mounting member is present directly below the contact points 186 and 188. By shortening the paths of electricity, the same effect as that of the first internal terminal 8 described above can be achieved, so that the electrical characteristics of the electrical connector set 6 can be improved.

Although the present disclosure has been described with reference to the above embodiments, the present disclosure is not limited to the above embodiments. For example, the number of internal terminals and external terminals may be any number.

In addition, in the embodiment, the case in which two mounting portions are provided in each of the first internal terminal 8 and the second internal terminal 26 has been described, the present disclosure is not limited to such a case. For example, two mounting portions may be provided in the first internal terminal 8, and only one mounting portion may be provided in the second internal terminal 26. In this case, the fourth mounting portion 58 of the second internal terminal 26 may be omitted and only the third mounting portion 56 may be provided, and only the third mounting portion 56 may be mounted on the second conductor 60 of the second substrate 25. In this case, the resist 61 of the second substrate 25 illustrated in FIG. 2D may be omitted, and the second conductor 60 divided into the two portions may be integrated into one.

While the present disclosure has been fully described in connection with preferred embodiments thereof with reference to the accompanying drawings, various variations and modifications are obvious to those skilled in the art. It should be understood that such variations and modifications are included in the present disclosure as long as they do not depart from the scope of the present disclosure according to the appended claims. In addition, changes in the combination and order of elements in each embodiment can be achieved without departing from the scope and spirit of the present disclosure.

It should be noted that any of the various embodiments described above can be combined as appropriate to achieve the effects of each embodiment.

The present disclosure is applicable to any electrical connector set.

What is claimed is:

1. An electrical connector set comprising:

a first substrate having a first conductor;

a first internal terminal having a first mounting portion and a second mounting portion that are directly mounted on the first conductor of the first substrate and a projecting portion extending in a curved shape between the first mounting portion and the second mounting portion;

a second substrate having a second conductor; and a second internal terminal having a third mounting portion that is directly mounted on the second conductor of the second substrate and a recessed portion configuring the third mounting portion at a bottom portion, wherein the projecting portion of the first internal terminal and the recessed portion of the second internal terminal are configured to fit with each other.

2. The electrical connector set according to claim 1, wherein the second internal terminal has a first portion rising from the bottom portion of the recessed portion on one side and a second portion rising from the bottom portion of the recessed portion on another side, and the first portion is a portion having a free end.

3. The electrical connector set according to claim 2, further comprising:

a fourth mounting portion with which the second internal terminal is mounted on the second conductor of the second substrate separately from the third mounting portion, wherein the second internal terminal further has a projecting portion that is connected to the second portion and a third portion extending from the projecting portion to the fourth mounting portion.

4. The electrical connector set according to claim 3, further comprising:

an insulator configured to hold the second internal terminal, wherein the third portion of the second internal terminal has a wide portion having a predetermined width, and the insulator has a first notch that is recessed to accommodate the wide portion of the third portion.

5. The electrical connector set according to claim 4, wherein the insulator further has a second notch that is recessed outward for the projecting portion of the second internal terminal.

6. The electrical connector set according to claim 2, wherein a width of the first portion of the second internal terminal is larger than a width of the second portion of the second internal terminal.

7. The electrical connector set according to claim 1, wherein the first and second conductors are conductors that are configured to connect to a power supply.

8. The electrical connector set according to claim 1, wherein the first and second conductors are conductors that are configured to connect to ground.

9. The electrical connector set according to claim 3, wherein a width of the first portion of the second internal terminal is larger than a width of the second portion of the second internal terminal.

10. The electrical connector set according to claim 4, wherein a width of the first portion of the second internal terminal is larger than a width of the second portion of the second internal terminal.

11. The electrical connector set according to claim 5, wherein a width of the first portion of the second internal terminal is larger than a width of the second portion of the second internal terminal.

12. The electrical connector set according to claim 2, wherein the first and second conductors are conductors that are configured to connect to a power supply.

13. The electrical connector set according to claim 3, wherein the first and second conductors are conductors that are configured to connect to a power supply.

14. The electrical connector set according to claim 4, wherein the first and second conductors are conductors that are configured to connect to a power supply.

15. The electrical connector set according to claim 5, wherein the first and second conductors are conductors that are configured to connect to a power supply.

16. The electrical connector set according to claim 6, wherein the first and second conductors are conductors that are configured to connect to a power supply.

17. The electrical connector set according to claim 2, wherein the first and second conductors are conductors that are configured to connect to ground.

18. The electrical connector set according to claim 3, wherein the first and second conductors are conductors that are configured to connect to ground.

19. The electrical connector set according to claim 4, wherein the first and second conductors are conductors that are configured to connect to ground.

20. The electrical connector set according to claim 5, wherein the first and second conductors are conductors that are configured to connect to ground.

* * * * *